C. TICHENOR.
ELECTRIC STARTING AND LIGHTING SYSTEM.
APPLICATION FILED FEB. 23, 1915.
1,193,205.
Patented Aug. 1, 1916.
5 SHEETS—SHEET 3.
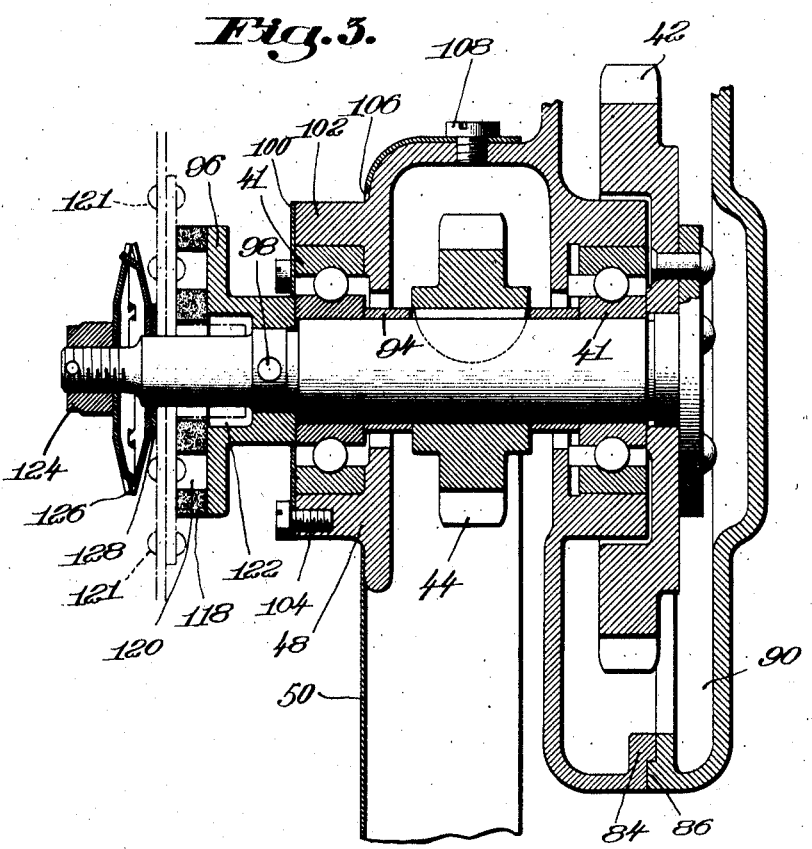
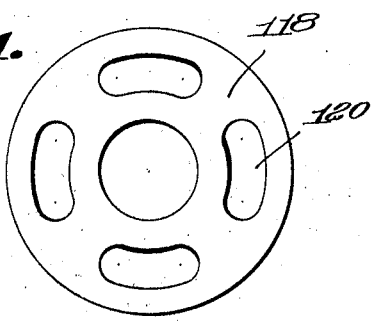

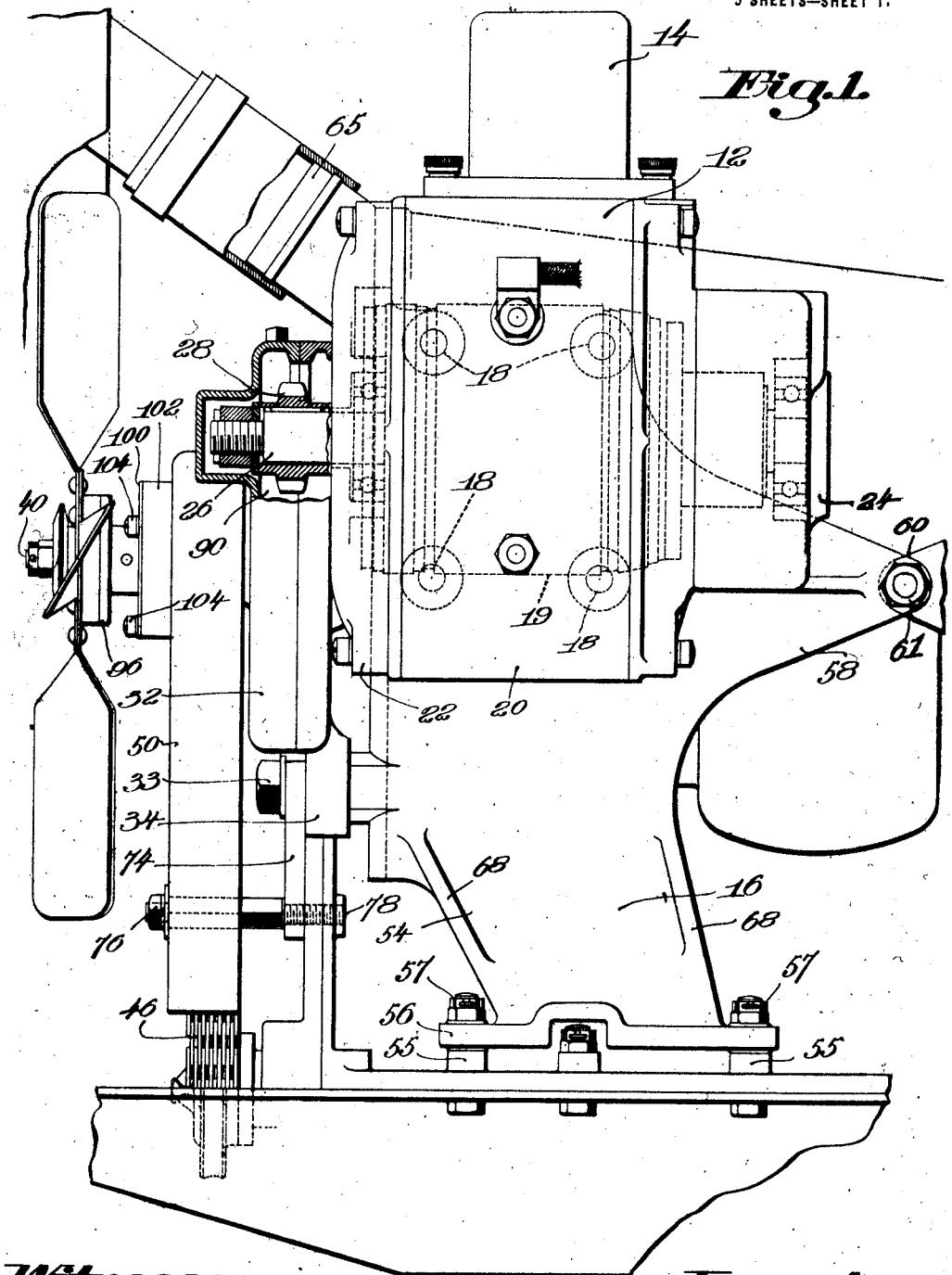

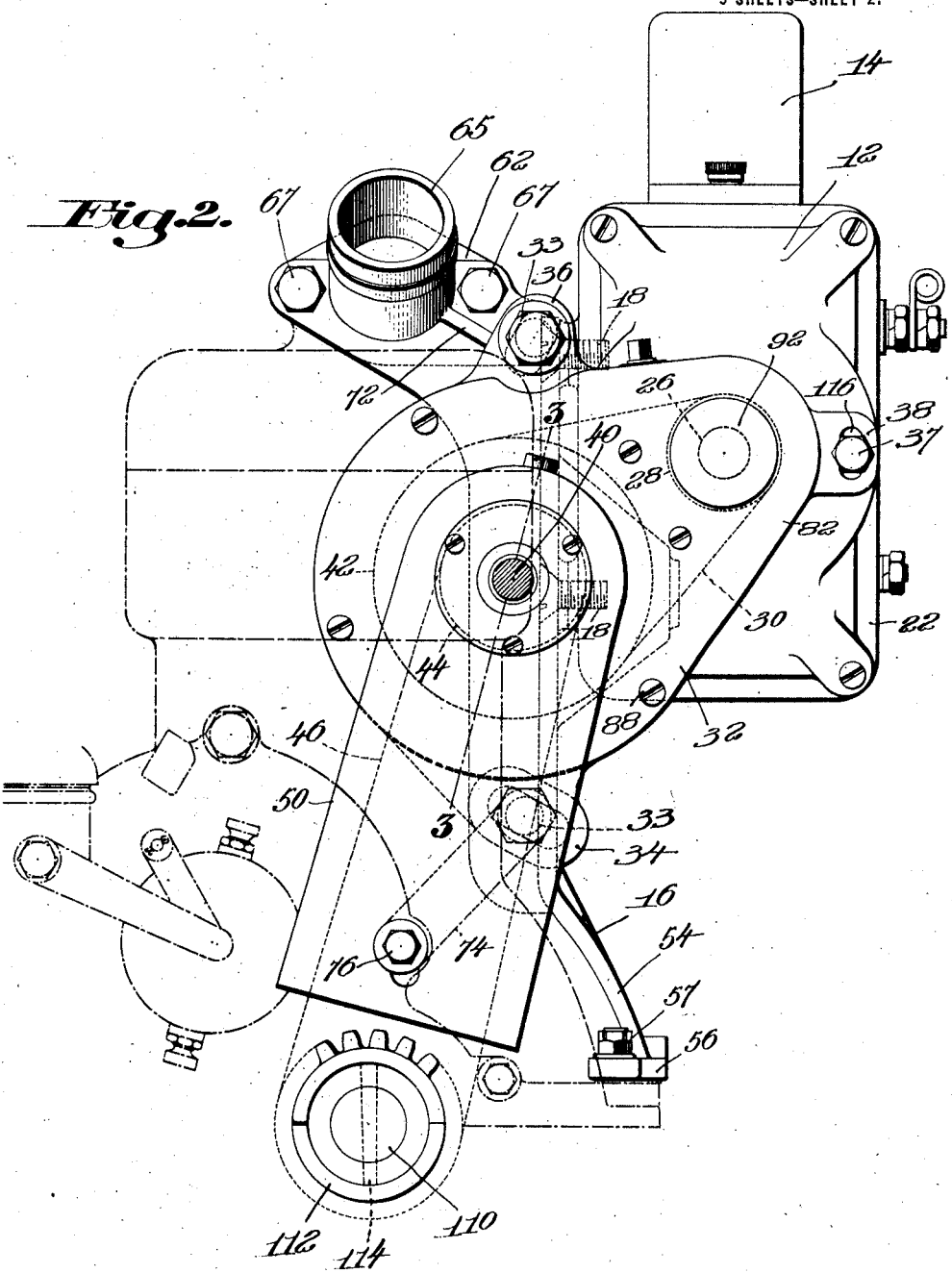

C. TICHENOR.
ELECTRIC STARTING AND LIGHTING SYSTEM.
APPLICATION FILED FEB. 23, 1915.
1,193,205.
Patented Aug. 1, 1916.
5 SHEETS—SHEET 4.
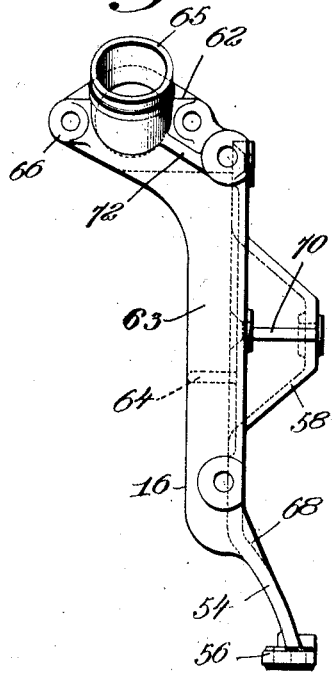
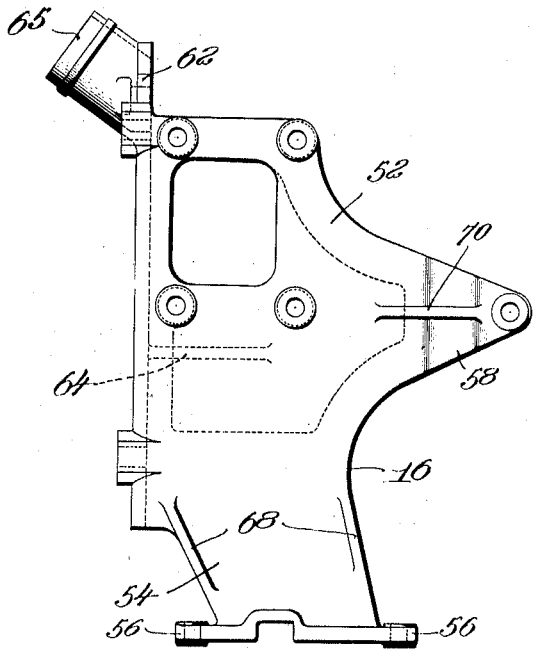
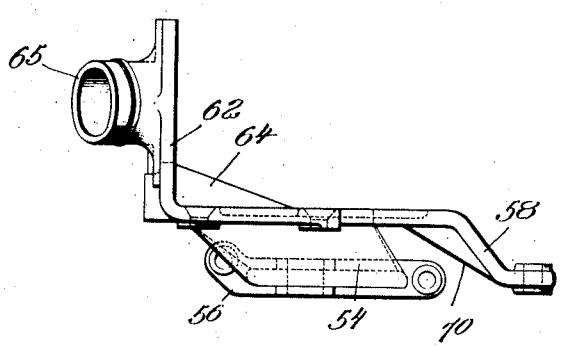

C. TICHENOR.
ELECTRIC STARTING AND LIGHTING SYSTEM.
APPLICATION FILED FEB. 23, 1915.
1,193,205.
Patented Aug. 1, 1916.
5 SHEETS—SHEET 5.
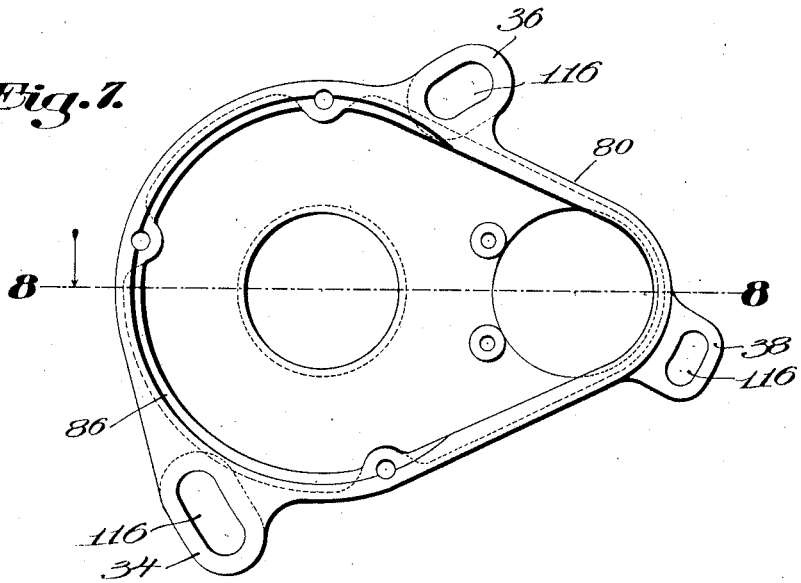
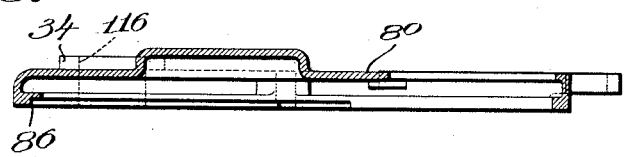
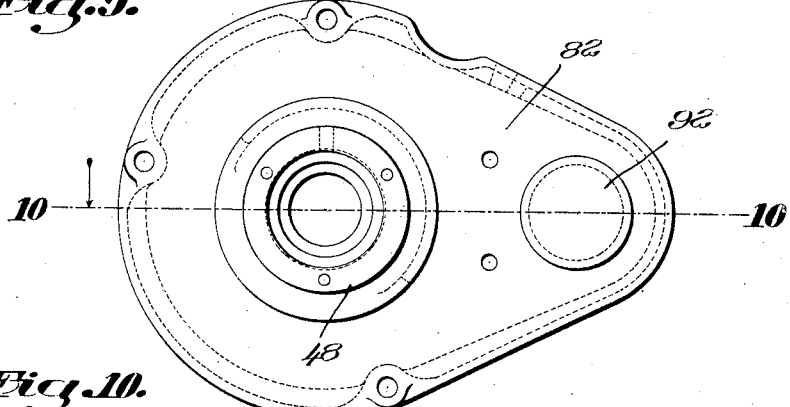
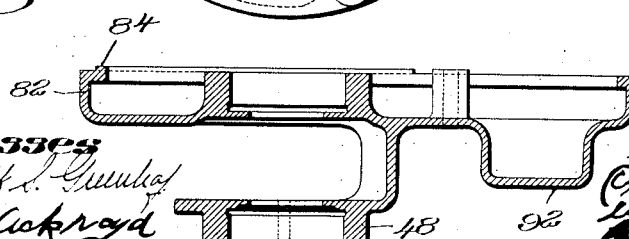

UNITED STATES PATENT OFFICE.

CARL TICHENOR, OF BOSTON, MASSACHUSETTS, ASSIGNOR TO GRAY & DAVIS, INC., OF BOSTON, MASSACHUSETTS, A CORPORATION OF MASSACHUSETTS.

ELECTRIC STARTING AND LIGHTING SYSTEM.

1,193,205.  Specification of Letters Patent.  Patented Aug. 1, 1916.

Application filed February 23, 1915. Serial No. 9,943.

*To all whom it may concern:*

Be it known that I, CARL TICHENOR, a citizen of the United States, residing at Allston, Boston, in the county of Suffolk and State of Massachusetts, have invented certain new and useful Improvements in Electric Starting and Lighting Systems, and I do hereby declare the following to be a full, clear, and exact description of the invention, such as will enable others skilled in the art to which it appertains to make and use the same.

This invention relates to an improved electric starting and lighting system for automobile motors.

More particularly, the invention relates to an improved assemblage of the motor generator unit for application to the Ford motor.

Many automobiles when manufactured are not equipped with electric starting and lighting systems, so that if it is desired to provide such an automobile with a starting and lighting system it is necessary to have a system which can be applied to the automobile without many alterations from its original construction. The drivers and owners of the majority of automobiles, and notably among them the Ford, are not persons of practical mechanical experience, so that the addition of parts which are complicated mechanically, and difficult to keep in proper adjustment, are naturally looked upon with disfavor. Several types of electric starting systems are now in use, the cost of which would not be prohibitive to an automobile owner, but the installation and maintenance of such systems requires mechanical skill and equipment, which restrictively limit their use. Further, many parts are added by the installation to such systems which are difficult to keep in adjusted alinement and proper running order.

The object of the present invention is to provide a motor generator unit which will overcome the above mentioned difficulties, that is complete in one assembly, and adapted to be readily applied to the Ford motor.

In accordance with this object, one feature of the invention contemplates the provision of an assembled motor generator starting unit consisting of a motor generator having its driving connections for the Ford motor crank shaft inclosed and all mounted upon a bracket, so that the assembled parts can be placed on the Ford motor casing as one piece.

Another feature of the invention contemplates the provision of an assembled motor generator unit in which the driving mechanism for the motor generator is permanently assembled in the unit in such a manner that the driving belt for connection with the Ford motor crank shaft may be tightened or loosened without interfering with the alinement of said driving mechanism or disassembling the unit.

In addition to the features of the invention above referred to, the invention also consists in certain devices, arrangements and combinations of parts hereinafter described and claimed, the advantages of which will be obvious to those skilled in the art.

The preferred form of the invention is illustrated in the accompanying drawings, in which:

Figure 1 is a side elevation showing the motor generator unit as applied to the Ford motor; Fig. 2 is a front elevation of the motor generator unit as applied to the Ford motor, and showing the connections thereof with the Ford motor crank shaft; Fig. 3 is a sectional detail taken on the line 3—3 of Fig. 2 showing the fan shaft mounting; Fig. 4 is a front elevation, Fig. 5 a side elevation, and Fig. 6 a plan view of the assembly bracket for the motor generator unit; Fig. 7 is a plan view of the motor generator drive chain housing; Fig. 8 is a section of the motor generator drive chain housing taken on the line 8—8 of Fig. 7; Fig. 9 is a plan view of the cover for the motor generator drive chain housing; Fig. 10 is a section of the cover for the motor generator drive chain housing taken on the line 10—10 of Fig. 9; and Fig. 11 is a plan view of the fan mounting washer.

The motor generator with its driving connections for the crank shaft of the Ford motor are all assembled as a unit and adapted to be applied as one piece to the Ford motor casing. The motor generator 12, with a current regulator 14 attached thereto, is mounted upon an assembly bracket 16 by means of four screws 18. The windings 19 of the motor generator have a casing consisting of a body 20, a front cap 22 on the drive end, and a rear cap 24. The armature shaft 26 projects through the front cap and is provided with a sprocket 28 on which the generator motor drive chain 30 is mounted. The drive chain 30 is inclosed in a motor generator drive chain housing 32 which is mounted by means of bolts 33 passing through bearings 34—36 on the housing into the assembly bracket 16 and bolt 37 passing through a bearing 38 into the front cap of the motor generator casing. Within the drive chain housing (Fig. 3) is journaled a fan shaft 40 in the bearings 41. This shaft supports an intermediate sprocket gear 42 on which the motor generator drive chain is mounted, and an intermediate sprocket gear 44 upon which a crank shaft drive chain 46 is mounted. The gear 44 is inclosed in an auxiliary bracket 48 on the outside of the drive chain housing, and over this auxiliary bracket is secured a shroud 50 which incloses the crank shaft chain. The parts thus far enumerated are secured as a unit upon the assembly bracket 16, and this unit can be applied as one piece to the Ford motor casing.

The assembly bracket shown in Figs. 4, 5 and 6 is constructed so that it may be fastened to the Ford motor casing without alteration of said casing, and to employ the same type of fastening means which are regularly placed on the motor casing. The assembly bracket consists of a body 52 upon which the motor generator is mounted, and three flanges that are attached integral with the body. The crank casing flange 54 (Fig. 1) has bearings 56 which are arranged to register with bearings 55 on the crank cover case so that the crank case bolts may be removed and longer bolts 57 inserted so as to firmly unite the assembly bracket with the crank cover casing. The water inlet flange 58 flares outwardly from the body so that a bearing 60 in its outer end will register over a bearing on the tubular water inlet casting of the cylinder cooling system of the Ford motor. The bearing 60 requires the use of a longer fastening bolt 61 than was needed to hold the water inlet flange. The water outlet flange 62 is mounted at the top of the assembly bracket at right angles to the body thereof and is integral with a body reinforcing rib 63. The rib 63 with the flange 62 are further connected to the body 52 by a reinforcing rib 64. A tubular water outlet section 65, for connection with the hose of the water cooling system of the Ford motor, is cast integral with the flange 62, and bearings 66 on the section 65 are adapted to register with the openings regularly employed for securing the tubular section of the water outlet to the Ford motor casing, so that the same fastening bolts 67 may be employed for holding the water outlet flange to the motor casing as are ordinarily employed for holding the tubular water outlet section upon the Ford motor casing. The crank case flange 54 has reinforcing ribs 68, the water inlet flange 58 has a reinforcing rib 70, and the water outlet flange 62 has a reinforcing rib 72, so that the entire structure of the assembly bracket is reinforced to resist the strains exerted during the starting of the Ford motor, and while generating power when the automobile is running. Besides the three points of connection of the bracket to the motor casing, the bracket is connected at a fourth point to the Ford motor casing by means of a tie brace 74 connected between the bolt 33 which passes through the bearings 34 of the drive chain housing and a bolt 76 which supports the crank chain shroud 50, and is secured in the timing gear casing of the Ford motor at 78. With this 4-point connection, the motor generator unit is securely held in position, and contributes toward strengthening the frame of the Ford motor casing.

The motor generator drive chain housing 32 consists of two parts, as shown in Figs. 7, 8, 9 and 10. The base plate 80 carries the bearings 34, 36 and 38 through which the plate is secured to the assembly bracket and motor generator casing. The housing is provided with a cover 82 which has a flange 84 (see Figs. 3, 8 and 10) adapted to interlock with a flange 86 on the plate 80 so that when the plate and cover are secured together by means of the screws 88 an oil tight chamber 90 will be made thus permitting the drive chain to run in oil. The cover 82 has a cap 92 which incloses the end of the armature shaft 26 and the auxiliary bracket 48 that incloses the intermediate gear 44.

The motor generator unit is constructed so that it may be assembled and adjusted for the alinement and tightness of the sprocket chains and the setting of the gearings. Therefore, when the unit is applied to the Ford motor no adjustment is necessary and the unit is inclosed and protected so that it will not get out of order. The fan shaft 40 is assembled in the drive chain housing with the gears 42 and 44 locked thereto, and the bearings 41 are located on the shaft by means of spacers 94 and secured in position by means of the fan mounting plate 96 which is held on the shaft by means of a pin 98. The fan shaft with its bearings is held in position in the drive chain housing by a cover plate 100 which is fastened to the bearing flange 102 on the auxiliary bracket 48 by means of screws 104. The shroud 50 has an opening 106 which fits over the bearing flange 102 and is secured in place upon the auxiliary bracket by means of a set screw 108.

The motor generator unit is factory assembled and may be placed upon the Ford motor by removing bolts from the Ford motor casing to be replaced by the bolts 57 in the flange 54, the bolt 61 in the flange 58 and the bolts 67 in the flange 62. The bearings in the assembly bracket will register with the openings of the above mentioned bolts and the bracket may be secured to the casing by placing the bolts in their respective flanges. The tie brace 74 is secured to the timer casing by means of the bolt 76 so that the whole structure is securely held to the Ford motor casing. The belt pulley ordinarily used for driving the cooling fan is removed from the crank shaft 110 and a spur gear 112 placed on the shaft by means of the same fastening pin 114 which is used to secure the belt pulley on the Ford motor. The crank chain is then placed upon the gear 112 and tightened by rotating the drive chain housing about the shaft 26 as a center. To permit of this adjustment the bearings 34, 36 and 38 are provided with arcuate slots 116 so that the bolts 33 for locking the housing to the assembly bracket and motor generator casing can be loosened and the housing adjusted to tighten or loosen the chain 46 when it is desired. The motor generator drive chain 30 is alined and adjusted for tightness when the motor generator unit is assembled so that this chain does not have to be adjusted when the unit is placed on the Ford motor. The bracket ordinarily used for supporting the Ford motor cooling fan is removed and the fan mounted upon shaft 40. Against the fan mounting plate 96 is placed a fiber washer 118, Fig. 11, which is provided with openings 120 to receive a row of fastening rivets 121 of the fan blades. The fan hub fits within a socket 122 formed in the mounting plate 96 and washer 118 and is held in place by means of a lock nut 124. Between the lock nut and fan is placed a spring washer 126 and a bearing plate 128 which act as a type of clutch to permit the fan shaft 40 to move relatively to the fan without giving a sudden acceleration to the fan blades. It will be noted that this construction with the fan shaft is located to the side of the center line of the Ford motor which permits the crank chain 46 to be incased and not interfere with the timer mechanism or the instalment of different types of ignition systems. With the bracket secured in place all of the parts of the Ford motor are accessible for repair and inspection and the cylinders are accessible for grinding of valves and repairing of parts without being hindered by the installation of a starting and lighting system.

While the particulars which are described are well suited to one mechanical form of the invention as adapted to the Ford motor, it is not to be understood that these particulars are essential since they may be variously modified within the skill of the artisan to apply the invention to other types of motors without departing from the true scope of the actual invention as defined by the claims.

What is claimed as new, is;—

1. An automobile electric starting and lighting apparatus, having, in combination, a motor generator starting unit adapted to be placed as one piece on the motor casing of an automobile motor, comprising a bracket having means for attachment to the motor casing, and a motor generator and fan having driving connections with each other and the engine crank shaft all supported by and mounted upon said bracket.

2. An automobile electric starting and lighting apparatus having, in combination, a motor generator starting unit adapted to be placed as one piece on the motor casing of a Ford motor, comprising a bracket having a plurality of connecting means for attachment with said casing, a motor generator, a fan shaft, driving connections between the motor generator and the fan shaft, a housing for the driving connections forming a support for the fan shaft, and driving connections between the fan shaft and the engine crank shaft, all supported by and mounted upon said bracket.

3. An automobile electric starting and lighting apparatus, having, in combination, a bracket adapted to be mounted in fixed position on the automobile engine casing, an electric motor generator mounted on said bracket, a motor generator casing, a housing arcuately adjustably mounted on said motor generator casing and bracket, a fan shaft mounted in said housing, driving means in said housing connecting the motor generator and the fan shaft, and a belt connecting the automobile engine crank shaft and the fan shaft which may be tightened by an arcuate adjustment of the housing.

4. An automobile electric starting and lighting apparatus having, in combination, a bracket, a motor generator, a fan shaft, driving means connecting the motor and fan shaft, a casing therefor supporting the fan shaft, and driving means connecting the fan shaft and engine crank shaft, and a shroud therefor attached to the driving means, all supported by and mounted on said bracket.

5. An assembly bracket for a motor generator unit of an automobile electric starting and lighting system, having, in combination a body for supporting the motor generator, a crank casing flange for attachment to the automobile crank casing, a water inlet flange for attachment to the water inlet flange of the automobile casing, a water outlet flange for attachment to the casing at the water outlet of the automobile, and a tie brace connected with said body for attachment to the timer gear casing of the automobile.

6. An assembly bracket for the motor generator unit of an automobile electric starting and lighting system, having, in combination, a body portion for supporting the motor generator, an offset crank casing flange having attaching means for the crank casing of the automobile, an outwardly flaring water inlet flange for attachment to the motor casing of the automobile, a water outlet flange set at right angles to the body having attachment means for the automobile motor casing at the water outlet, and reinforcing ribs on said flanges to strengthen said bracket against vibratory strains.

7. An assembly bracket for supporting a motor generator unit of an automobile electric starting and lighting system consisting of a body portion for supporting the motor generator, a crank case flange, a water inlet flange, and a water outlet flange set at right angles to the body portion having a tubular section of the water outlet flange cast integral therewith.

8. An automobile electric starting and lighting apparatus having, in combination, a bracket having provision for attachment to the automobile engine, a motor generator provided with a casing mounted upon said bracket with its shaft parallel with the engine shaft, an intermediate shaft, driving connections between said intermediate shaft and the motor generator, a housing therefor pivotally mounted on the motor generator casing and affording a support for the intermediate shaft, and driving connections between the intermediate shaft and the automobile engine, all supported by and mounted on said bracket.

9. An assembly bracket for a motor generator unit of an automobile electric starting and lighting apparatus having, in combination, a body portion for supporting the motor generator, a rearward extension for attachment to a part of the engine casing, a bottom extension for attachment to another part of the engine casing, and a lateral flange extending at right angles to the body portion for attachment to a third portion of the engine casing.

10. An assembly bracket for a motor generator unit of an automobile electric starting and lighting apparatus having, in combination, a body for supporting the motor generator, a crank casing flange for attachment to the engine crank casing, a water inlet flange for attachment to the water inlet flange of the engine casing, a water outlet flange for attachment to the casing at the water outlet of the engine, said flange being arranged at right angles to the body portion and strengthening the bracket to resist the operating stresses.

11. An automobile electric starting and lighting apparatus having, in combination, a bracket having provision for attachment to the engine casing, a motor generator, a casing for the motor generator, means for attaching the motor generator casing to the bracket, driving means connecting the motor generator and the engine, a housing for such driving means provided with means for attachment at the top and bottom to the bracket and on one side to the motor generator casing.

12. An automobile electric starting and lighting apparatus having, in combination, a motor generator starting unit adapted to be placed as one piece on the motor casing comprising a bracket, means for attachment to the engine casing, a motor generator mounted on the bracket, an intermediate shaft, connections between the intermediate shaft and the motor generator, connections between the intermediate shaft and the engine crank shaft, a housing inclosing the connections having provision for arcuate adjustment to vary the distance of the intermediate member from the crank shaft while maintaining the distance between the intermediate member and the motor generator constant, and means for securing the parts in place.

13. An automobile electric starting and lighting apparatus for Ford automobiles having, in combination, a motor generator starting unit adapted to be placed as one piece on the engine casing comprising a bracket having a water outlet tube and flange adapted to be secured to the water outlet of the engine casting in lieu of an outlet pipe removed, a second portion adapted to be secured to the water inlet flange without removal of the water inlet pipe casting, a third portion adapted to be bolted to the crank casing, a fourth portion and a tie brace adapted to connect such fourth portion to the timer gear casing.

14. An assembly bracket for a motor generator unit of an automobile electric starting and lighting apparatus having, in combination, a body to which the motor generator is adapted to be attached, a rearwardly extending portion, a downwardly extending portion, and a laterally extending portion, adapted to be bolted to three different parts of the automobile engine casing, and a fourth portion adapted to be connected by a tie brace to a fourth portion of the engine casing.

CARL TICHENOR.

Witnesses:
 JOHN BOYD,
 H. W. TAPLIN.